(12) United States Patent
Baldassini et al.

(10) Patent No.: US 8,073,757 B2
(45) Date of Patent: Dec. 6, 2011

(54) DATA PROCESSING FOR AN EXCHANGE TRADED FUND

(75) Inventors: Ronald Baldassini, Braintree, MA (US); Paul M. Murphy, Boston, MA (US); Kirk Cleathero, Norton, MA (US); Ian Johnson, Westborough, MA (US); Chip Russo, Northborough, MA (US); Timothy Hanifin, Wayland, MA (US); Gail Knudsen, Norwell, MA (US); James Boucher, Stow, MA (US)

(73) Assignee: FMR LLC, Boston, MA (US)

( * ) Notice: Subject to any disclaimer, the term of this patent is extended or adjusted under 35 U.S.C. 154(b) by 1650 days.

(21) Appl. No.: 11/232,571

(22) Filed: Sep. 21, 2005

(65) Prior Publication Data

US 2006/0100955 A1  May 11, 2006

Related U.S. Application Data

(60) Provisional application No. 60/612,194, filed on Sep. 22, 2004.

(51) Int. Cl.
*G06Q 40/00* (2006.01)

(52) U.S. Cl. .................. 705/36 R; 705/36 T; 705/35

(58) Field of Classification Search .................. 705/37, 705/36 R, 35, 36 T, 38, 39
See application file for complete search history.

(56) References Cited

U.S. PATENT DOCUMENTS

| | | | |
|---|---|---|---|
| 5,193,056 A | 3/1993 | Boes | |
| 6,601,044 B1 * | 7/2003 | Wallman | 705/36 R |
| 6,879,964 B2 | 4/2005 | Sauter et al. | |
| 7,031,937 B2 * | 4/2006 | Brown et al. | 705/36 T |
| 7,117,176 B2 * | 10/2006 | Wallman | 705/36 R |
| 2002/0059127 A1 * | 5/2002 | Brown et al. | 705/36 |
| 2002/0120541 A1 * | 8/2002 | D'Ambrosio et al. | 705/36 |
| 2003/0105697 A1 * | 6/2003 | Griffin et al. | 705/36 |
| 2003/0144947 A1 | 7/2003 | Payne | |
| 2003/0154151 A1 * | 8/2003 | Biondi et al. | 705/37 |
| 2004/0210502 A1 | 10/2004 | Madhavan et al. | |
| 2005/0216407 A1 | 9/2005 | Feldman et al. | |

* cited by examiner

*Primary Examiner* — Kelly Campen
(74) *Attorney, Agent, or Firm* — Fish & Richardson P.C.

(57) ABSTRACT

An accounting system allows posting transactions to a general ledger of an Exchange Traded Fund. The accounting system includes a computer-assisted process that nets subscription and redemption orders that occurred over a particular time (e.g., one day) and records a transfer of securities into or out of the fund based on the net of the subscription and redemption orders.

8 Claims, 4 Drawing Sheets

DATA PROCESSING FOR AN EXCHANGE TRADED FUND

CROSS-RELATED APPLICATION

Under 35 U.S.C. 119(e)(1), this application claims the benefit of provisional application Ser. No. 60/612,194, filed Sep. 22, 2004 entitled, "Data Processing for an Exchange Traded Fund."

TECHNICAL FIELD

This description relates to exchange traded funds.

SUMMARY

In one aspect, the invention features an accounting system for posting transactions to a general ledger of an Exchange Traded Fund. The accounting system includes a computer-assisted process that nets subscription and redemption orders that occurred over a particular time (e.g., one day) and records a transfer of securities into or out of the fund based on the net of the subscription and redemption orders.

In one particular implementation, the accounting system selects securities held by the fund for redemption based on the cost basis of the securities held by the fund if there is a net redemption of shares of the fund.

In another aspect, the invention features a computerized accounting system for an ETF that ranks lots of the security held by the fund based on the tax liability of each lot and selects lots of the security based on whether the trade order is an order to sell the security or an order to redeem the security. Such a tax lot selection method is particularly advantageous in the context of an ETF since there are different tax implications depending upon whether the securities are transferred out of the fund due to a sale (which incurs a tax liability to the fund) versus due to a redemption (which does not incur a tax liability).

In one particular implementation, the accounting system selects tax lots having the lowest cost basis if the order is a redemption and selects tax lots having the least tax liability if the order is a sale.

DETAILED DESCRIPTION

An Exchange Traded Fund, or ETF, is a hybrid investment vehicle that combines characteristics of both open and closed end funds. Like an open-end mutual fund the ETF provides investors with its net asset value once daily, but similar to a closed end fund it also lists its shares on a secondary market such as an exchange. Thus an ETF may be bought and sold in the primary market directly from the ETF via a market intermediary referred to as an Authorized Participant (or AP), or on a secondary market at market prices which fluctuate based on supply and demand.

APs in the primary market purchase large increments of shares (referred to as Creation Units), while secondary market shares are available to individual investors involving transactions in smaller share increments via brokers.

As part of their investment strategy, ETFs may seek to track a particular stock market index, such as the NASDAQ Composite Index. To accomplish this index tracking, ETFs commonly bundle together the some or all of the constituent securities that are part of the index in the ETF's investment portfolio.

Investment company sponsors, such as Fidelity Investments®, may offer different types of funds that each issue shares representing the same portfolio of assets. For example, an investment company sponsor may offer a traditional open-end mutual fund and an ETF that both track the NASDAQ Composite Index. Similarly, if eventually permitted by securities regulations, an investment company sponsor may want to offer an ETF-version of an actively managed open end fund, such as the Fidelity Magellan® fund. Because the two (or more) funds represent the same portfolio of assets, it may be advantageous for an investment company sponsor to pool the funds' assets into a single "master" trust to achieve certain economies of scale, which ultimately could lead to lower management fees for both funds.

Figure 1:
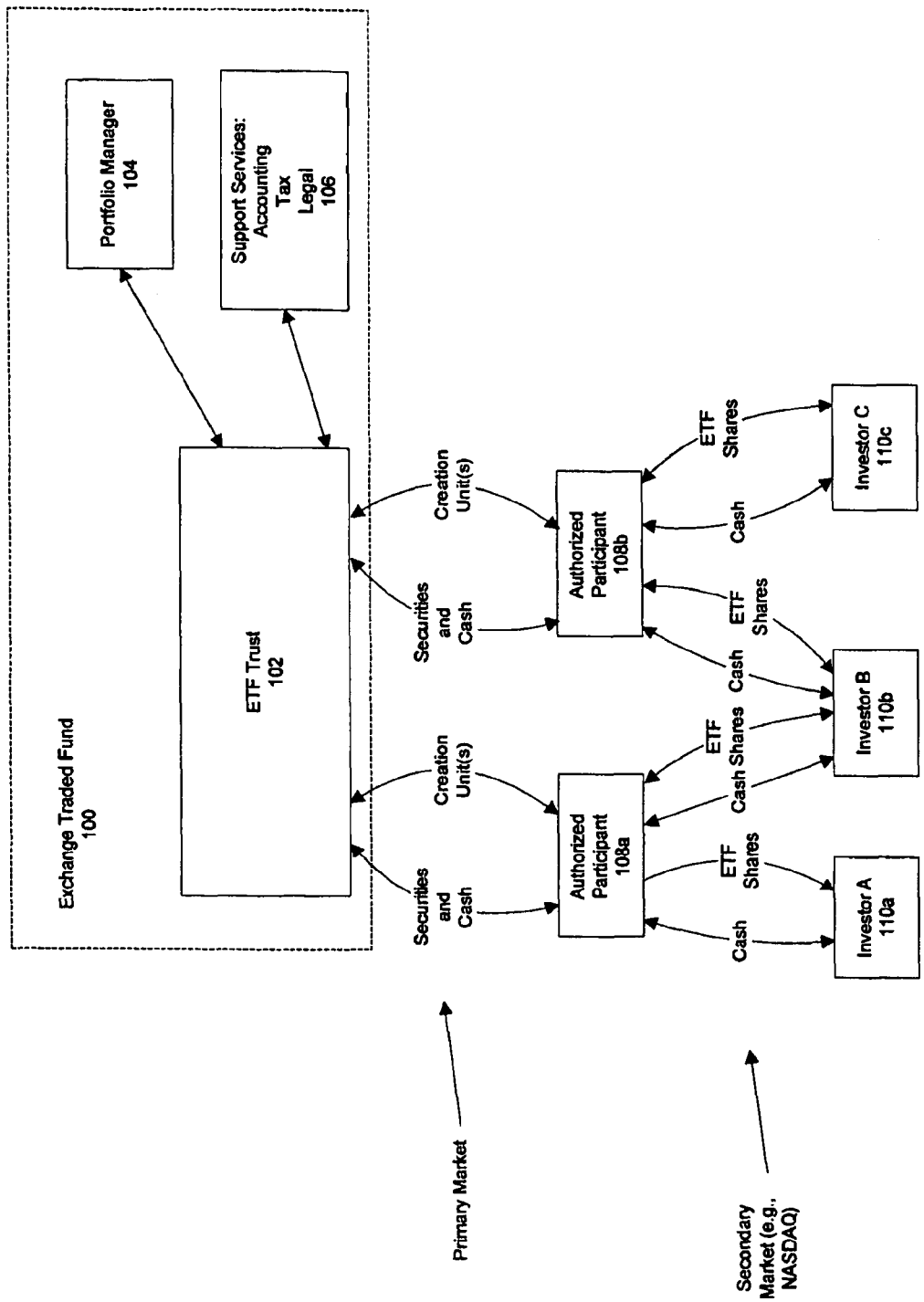
FIG. 1 is a diagram illustrating the exchange of shares of an Exchange Traded Fund on a primary and secondary market.

As shown in FIG. 1, an Exchange Traded Fund 100, for example the Fidelity® NASDAQ Composite Index® Tracking Stock, is part of a trust 102 that holds the assets of the fund. The ETF 100 is managed by the Portfolio Manager 104, and receives a number of services 106 such as accounting, tax, and legal.

The ETF 100 issues and redeems shares to APs 108a, 108b in large increments termed Creation Units via the Depository Trust Company or the Continuous Net Settlement System of the National Securities Clearing Corporation. Purchases of Creation Units are made by tendering a basket of designated stocks to the fund (known as Deposit Securities) in exchange for a Creation Unit. The fund's Portfolio Manager 104 creates the list of Deposit Securities that an AP must deliver tomorrow in order to exchange for one Creation Unit (a block of 100,000 shares) of the ETF. Similarly, a Creation Unit may be redeemed by an AP presenting the Creation Unit of the ETF (e.g., a block of 100,000 shares) in return for a basket of stocks which should approximate the composition of the NASDAQ index (in the case where the ETF tracks the NASDAQ index).

Both the subscription and redemption of Creation Units are known as "in-kind" transactions in the ETF since payments are made in-kind via a basket of securities, along with a smaller cash component. The cash component (sometimes referred to as the Balancing Amount) is equal to the difference between the NAV of a Creation Unit (as calculated by a NAV Generator) and the market value of the Deposit Securities on the day the subscription or redemption transaction takes place. The Balancing Amount serves to equalize the amount paid for a Creation Unit with the value of the Creation Unit itself. Unlike typical mutual fund purchase and sale transactions involving cash, subscription and redemption transactions of Creation Units are not taxable events for the fund under current Federal tax law.

Figure 2:
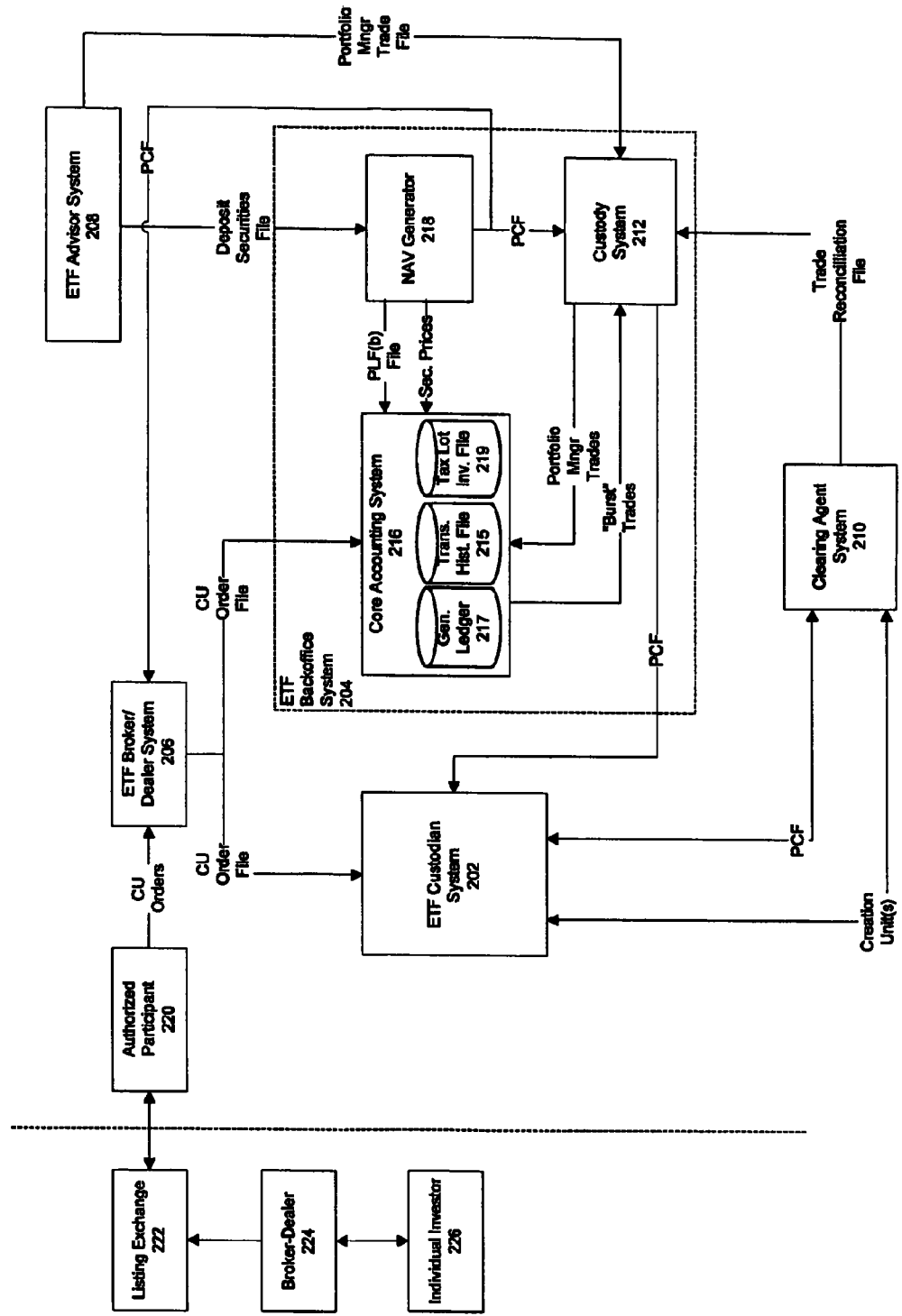
FIG. 2 is a diagram of an implementation of an ETF.

As shown in FIG. 2, an Exchange Traded Fund is implemented via an ETF Custodian System 202, an ETF Back office System 204, an ETF Broker/Dealer system 206, an ETF Advisor System 208, and a Clearing Agent System 210.

The ETF broker/dealer system 206 is maintained by a licensed broker/dealer associated with the ETF, such as National Financial Services (NFS), and is configured to receive subscription and redemption orders from Authorized Participants in the fund, such as Authorized Participant 220. Authorized Participants may place subscription or redemption orders with the Broker/Dealer System 206 between specified hours during a trading day, for example, between 9:00 am and 3:00 pm. As the Broker/Dealer System 206 receives creation unit orders from Authorized Participants during this time, it records each orders in a file called the CU Order file. At the end of order period, the Broker/Dealer System 206 transmits the CU Order file to the ETF Back Office System 204 and the ETF Custodian System 202. The ETF Custodian System 202 executes each of the CU orders on the next trading day through Clearing Agent 214. When an Authorized Participant receives a creation unit, it may list shares of the ETF on a listing exchange 222, e.g., NASDAQ, where individual investors 226 may trade ETF shares through various broker/dealers 224.

The ETF advisor system 208 is associated with the Portfolio Manager of the ETF and provides two functions. First, the ETF Advisor System 208 executes trades directed by the Portfolio Manager (typically through a clearing agent) and transmits a record of these trades to the Core Accounting System 216 through the Custody System 212. Second, the ETF Advisor System 208 determines once per trading day (i) the basket of securities plus (ii) an estimated balancing amount (or cash component) necessary to acquire a Creation Unit on the next trading day. The ETF Advisor System records the basket of securities in a text file named the Deposit Securities file and transmits this file to NAV Generator 218 in the ETF Backoffice System 204. The ETF Advisor System 208 also disseminates both pieces of information (i.e., the basket of securities and estimated balancing amount) to the Authorized Participants, which provides the Authorized Participants an estimated "price" of a creation unit for the next day (although the actual price may vary because the actual balancing amount is not known until the end of the trading day on which the order was placed when the daily NAV is computed).

The ETF Custodian System 202 is maintained by the trustee of the ETF and, as mentioned above, receives the CU Order File from the ETF Broker/Dealer System 206. The ETF Custodian System 202 settles each of the orders listed in the CU Order file through Clearing Agent 214 to transfer the underlying basket of securities plus the balancing amount into or out of the fund. In some instances the actual cash component may be negative, which in the case of a subscription transaction, would mean that the ETF would pay the Authorized Participant the cash component, and in the case of a redemption transaction, would mean that the Authorized Participant would pay the ETF the cash component.

The ETF back office system 204 includes a Core Accounting System 216, a Net Asset Value (NAV) generator 218, and a Custody System 212.

The NAV Generator 218 receives the closing prices of securities from various exchanges and computes the daily NAV for the ETF based on the number of outstanding fund shares and the securities held by the fund and their closing prices. The NAV Generator 218 also receives and stores the Deposit Securities files (which lists the identity and amount of each required security) and computes the Portfolio Composition File (PCF), which, includes the quantity of each of the requisite Deposit Securities and the actual balancing amount necessary to acquire a creation unit. The PCF is distributed to the ETF Broker Dealer 206 and the ETF Custodian 202 (via the Custody System 212).

The NAV Generator 218 is also configured to provide the Deposit Securities file and the closing prices of various securities to the Core Accounting System 216, which, as explained in more detail below, uses this information to post net subscription and redemption transactions to the fund's General Ledger 217.

The Custody System 212 receives the Portfolio Manager Trade file from the ETF advisor system 208 and forwards it to the Core Accounting System 216 for posting to the General Ledger 217. The Custody System 212 also receives a Trade Reconciliation file from the Clearing Agent System 210, which is used to reconcile actual trades conducted via the Clearing Agent with transactions posted to the general ledger by the Core Accounting System 216.

The Core Accounting System 216 maintains the General Ledger 217, a Transaction History file 215 and a Tax Lot Inventory file 219. The Transaction History file provides the principal audit trail of trade and adjustment activity for the entire life of every tax lot created. It includes all trade-based transactions of the fund, such as buys and sells, as well as information about non-trade based core accounting activities, such as corporate actions, mark-to-market activity, and internally generated cost adjustment transactions. Each record in the Transaction History file includes three parts. The first part contains the data about the actual trade such as the transaction type (e.g., buy), CUSIP number of the security, trade date, settle date, quantity/par of the trade and execution price. The second part of the record contains tax lot information for the trade, including the original, book, and tax cost information. The third part of the record contains position level data related to the average cost positions for the fund's holdings in the affected CUSIP identification.

The Tax Lot Inventory file 219 provides a comprehensive list of the current tax lot positions of the ETF. Tax lots that have been disposed of by the ETF are purged from the file and thus only open tax lost positions are maintained in the Tax Lot Inventory file. Each tax lot record maintained in the Tax Lot Inventory file 219 includes data about the current quantity and cost basis for each tax lot. The cost basis for the tax lots reflect all sales, cost adjustments and amortization accruals that have occurred since the tax lot was purchased.

In operation, the ETF Advisor System 208 determines at the close of each trading day the basket of securities and an estimated balancing amount required to acquire a Creation Unit for the next trading day and creates a text file, called the Deposit Securities file, that lists the quantity required for each security. For example, if the ETF tracks the NASDAQ Composite Index, ETF fund manager would require that the basket of securities include a certain quantity of the securities that make up the NASDAQ Composite Index. For some securities that comprise the NASDAQ Composite Index, the ETF fund manager may not include any shares in the basket of securities, especially where the percentage of the index weight of the security is very small. Thus, for example, if "XYZ Corp." comprises only 0.0002% of the NASDAQ Composite Index, the ETF fund manager may choose not to require any shares of this company within the basket of securities tendered for a CU.

At the same time the ETF Advisor System 208 determines the requisite basket of securities, it also estimates the balancing amount that will be required for each CU transaction and disseminates both the basket of securities and estimated balancing amount to the Authorized Participants. In addition, the ETF Advisor System 208 transmits the Deposit Securities file to the NAV Generator 218, where it is stored.

The NAV Generator 218 computes both a NAV of the fund and a Portfolio Composition File at the end of each trading day. The Portfolio Composition file includes Deposit Securities file and the actual balancing amount for CU orders placed on the trading day. The NAV Generator 218 computes the actual balancing amount by multiplying the net assets of the ETF by the number of shares per CU and dividing by the number of outstanding shares and then subtracting the value of the Deposit Securities file. The NAV Generator 218 transmits the Portfolio Composition File to the ETF Custodian System 202 and ETF Broker/Dealer System 206 via the Custody System 212.

The ETF Advisor System 208 lists all trades, if any, executed by the fund manager during the trading day in the Portfolio Manager Trade file and transmits this file at the end of each trading day to the Core Accounting System 216 through the Custody System 212.

At the end of a trading day, the ETF broker/dealer transmits the CU Order file (which lists all of the Creation Unit orders received for the day) to the Core Accounting System 216 and the ETF Custodian System 202.

Figure 3:
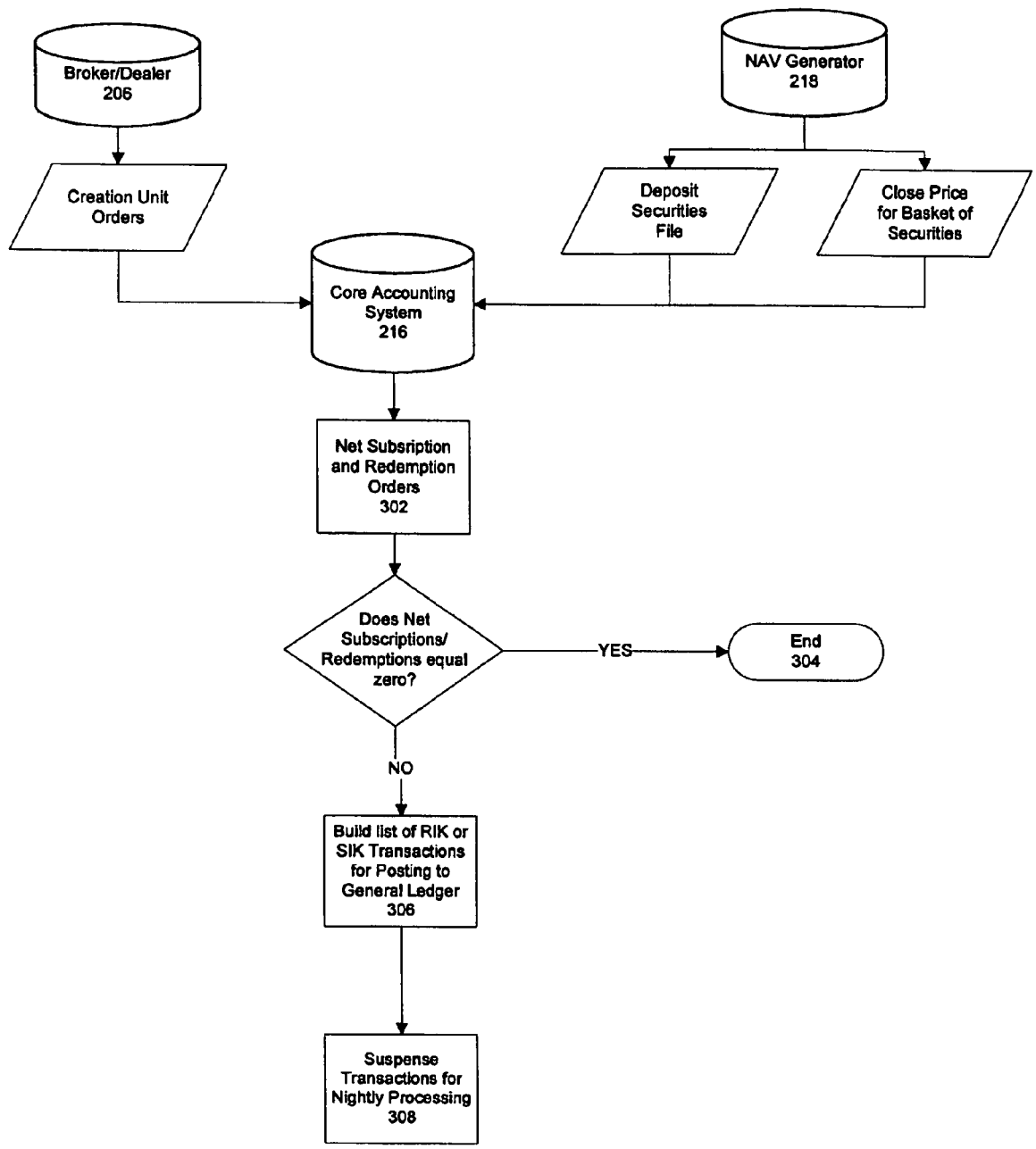
FIGS. 3-4 are flow charts illustrating accounting processes for an ETF.

Referring to FIG. 3, the Core Accounting System 216 receives the CU Order file, Deposit Securities file, and close prices for the basket of securities at the end of each trading day. The Core Accounting System 219 reads the CU Order file and nets 302 the subscription and redemption orders to a single value. If the subscription and redemption orders net to zero, the process ends 304 and no redemptions or subscriptions are entered into the fund's general ledger.

If the subscription and redemption orders do not net to zero, the Core Accounting System builds 306 a list of transactions that require entry in the general ledger based on the net subscription and redemption orders, the required amount of deposit securities, and the close prices of the deposit securities. In particular, the Core Accounting System takes the securities in the basket (provided in the Deposit Securities file received from the NAV Generator) and multiplies them by the net Creation Units and their respective closing price (also received from the NAV Generator). For example, if there is a net of two (2) subscription orders for the day and if the 'basket' calls for 1,000 shares of Microsoft® Corporation as part of the delivery and the security closed at $50.00, the Core Accounting System would create a subscription in kind transaction for 2,000 shares of Microsoft at a cost of $100,000 (i.e., 1,000×2×$50.00). In the event that there was a net of two (2) redemption orders, the Core Accounting System 216 would create a redemption in kind for 2,000 shares at $50.00 per share. After building a list of redemption/subscription transactions, the Core Accounting System suspenses 308 the net subscription/redemption orders for posting to the general ledger along with any other transactions the need to be posted to the general ledger.

Figure 4:
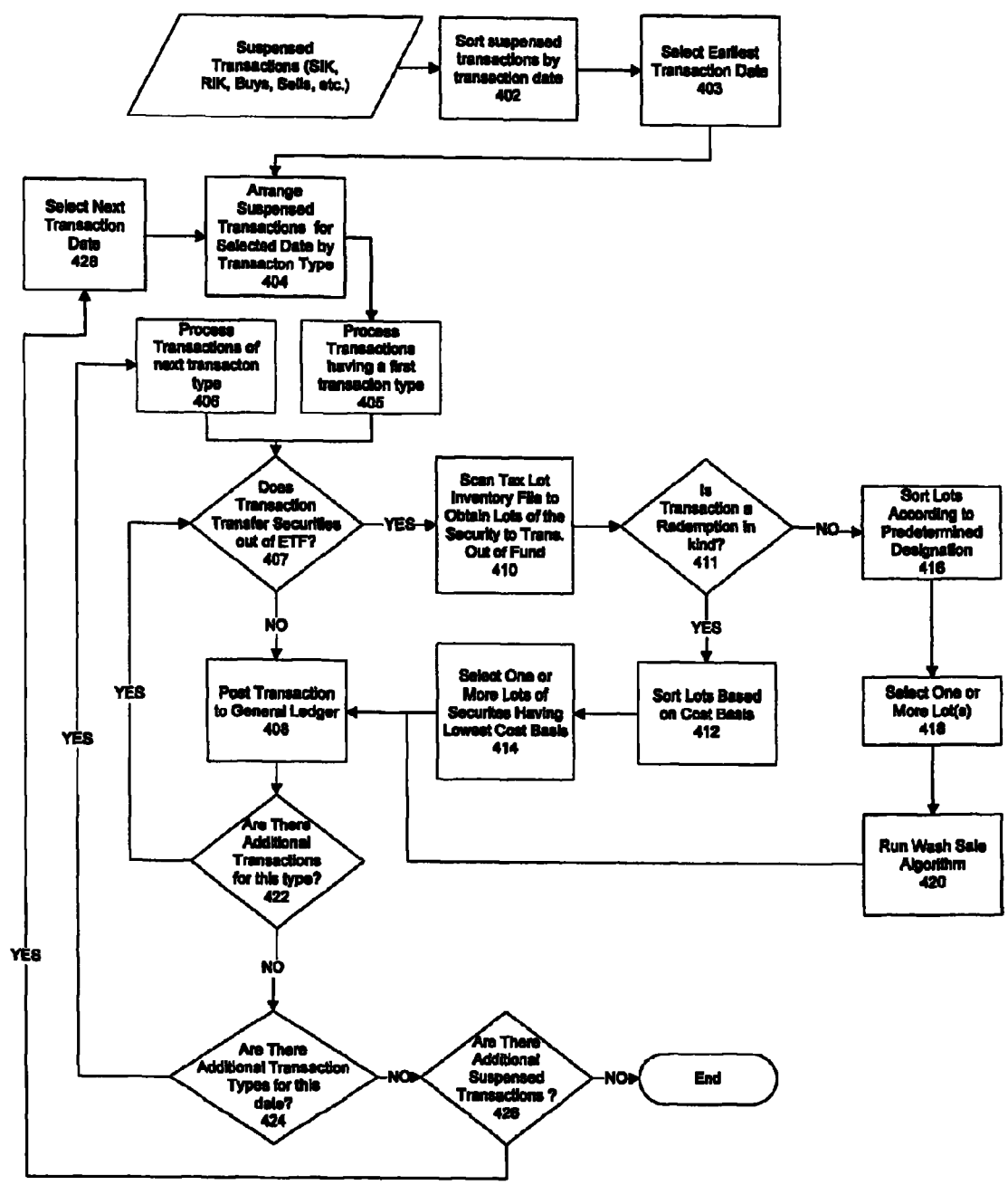

As shown in FIG. 4, the Core Accounting System processes every night after trading all suspended transactions for posting to the general ledger. The suspended transactions include not only the redemption or subscription in kind transactions, but also any buys, sells, puts, calls, cancels, re-bookings (i.e., a transaction that was mistakenly booked to another fund), wash sales, expires, short sells, cover shorts, paydowns, payups, maturities, cost adjustments, open futures contracts, close futures contracts, receives, delivers, or other transactions that require posting to the general ledger.

Referring to FIG. 4, the Core Accounting System arranges 402 the suspended transactions by transaction date and then selects 403 the earliest transaction date. The Core Accounting System then arranges 404 the suspended transactions for the selected date by transaction type (e.g., redemption in kind, subscription in kind, buys, sells, etc.). While most of the suspended transaction occur on same day in which the nightly processing occurs, occasionally transactions that occurred on a previous day must be processed for posting to the general ledger. For example, a previous transaction may have been mistakenly booked to another fund and would have to be rebooked to the proper fund.

The Core Accounting System processes 405, 406 each transaction type (e.g., buy, sell, net redemptions/subscriptions, etc.) for posting to the general ledger. As the Core Accounting System processes the suspended transactions, it determines 407 if the transaction transfers securities out of the ETF. Sell transactions and redemption transactions are examples transactions in which securities are transferred out of the ETF. If the transaction type does not transfer securities out of the ETF, then the Core Accounting System records 408 the transaction to the general ledger. For example, if the transaction type is a buy, the Core Accounting System will write the date and time of the transaction, an identification of the security purchased, the amount of shares purchased, the price paid per share, and other transaction-related information as an entry in the general ledger database. Similarly, if the transaction type is an open futures contract, the Core Accounting System will write the date and time the contract was purchased, an identification of the underlying security, the contract price and the contact date as a separate entry in the general ledger database.

If the Core Accounting System determines 407 that the transaction transfers securities out of the ETF, it queries 410 the Tax Lot Inventory file obtain the lots of the security which is to be transferred out of the fund.

The Core Accounting System also determines 411 if the transaction type is a redemption in kind. If the transaction is a redemption in kind, then the Core Accounting System, in this particular implementation, sorts 412 the tax lots (from the Tax Lot Inventory file) from the lowest cost basis to the highest cost bases and selects 414 the lot(s) having the lowest cost bases for posting 408 to the general ledger. based on a predetermined designation, which is typically elected by the Portfolio Manager. In another implementation, the Core Accounting System ranks lots of the security having the highest potential tax liability by factoring in the cost basis and whether the tax lot is subject to long-term or short term capital gains and then selects one or more lots of the security having the highest potential tax liability for posting to the general ledger.

If the transaction type is not a redemption in kind, the Core Accounting System sorts 416 and selects 418 tax lots based on a preselected preference for the fund, which may be determined by the Portfolio Manager. In many cases, the predetermined preference for a fund is for the accounting system to select lots of securities yielding the greatest tax advantage for the fund. In this case, the Core Accounting System sorts the lots based on potential tax liability. In this regard, the Core Accounting System multiplies the unit cost for each lot by the potential gain or loss on each unit (using the current close price of the security). For lots that have been held for less than a year (and thus subject to short term capital gains or losses), the core accounting system multiplies the potential loss or gain lots by 1.8, which is the short term capital gain tax rate (0.36) divided by the long term capital gain tax rate (0.20). This factor is subject to change based on current tax rates. After sorting the lots based on potential tax liability, the Core Accounting System 216 selects 418 one or more lots of securities having the lowest potential tax liability to record for the sale. Other tax lot selection algorithms may be specified for the fund, including selection of lots having the highest cost, lowest cost, minimum gain, maximum gain, and minimum tax.

After selecting the lots for potential sale, the Core Accounting System runs 420 a wash sale process on the selected lots. The wash sale rule specifies that a taxpayer cannot claim a loss on a security that was bought back within 30 days, and, therefore, the wash sale process examines (i) purchases to the fund and sales from the fund sold at a loss traded within the prior 30 days that have not been applied to another wash sale and (ii) sales at a loss and purchases traded within the prior 30 days that have not been applied to another wash sale. Adjustments are made on the purchase lots cost basis for the amount of the disallowed loss and holding period to include the period held on the disallowed loss. After the wash sale process is applied to the selected lots, the transaction is posted 408 to the general ledger using the selected lots.

The core accounting system repeats this process for each suspensed transaction until all of the suspensed transactions are posted to the general ledger.

A number of embodiments of the invention have been described. Nevertheless, it will be understood that various modifications may be made without departing from the spirit and scope of the invention. Accordingly, other embodiments are within the scope of the following claims.

The invention claimed is:

1. A machine-implemented method for selecting one or more lots of a security held by an exchange traded fund, the method comprising:
   causing a machine to receive an order to transfer a lot of a security out of the fund;
   causing the machine to rank lots of the security held by the fund based on the tax liability of each lot; and
   causing the machine to select one or more lots of the security based on whether the trade order is an order to sell the security or an order to redeem the security.

2. The method of claim 1, wherein causing the machine to select one or more lots of the security based on whether the trade order is an order to sell the security or redeem the security comprises:
   causing the machine to determine that the order is an order to redeem the security; and
   causing the machine to select one or more lots of the security having the lowest cost basis.

3. The method of claim 1, wherein causing the machine to select one or more lots of the security based on whether the trade order is an order to sell the security or redeem the security comprises:
   causing the machine to determine that the order is an order to sell the security; and
   causing the machine to select one or more lots of the security having the least tax liability.

4. The method of claim 1 further comprising:
   causing the machine to record a selected lot of the security as a transaction.

5. A computer-readable medium having encoded thereon software for selecting one or more lots of a security held by an exchange traded fund, the software comprising instructions for:
   receiving an order to transfer a lot of a security out of the fund;
   ranking lots of the security held by the fund based on the tax liability of each lot; and
   selecting one or more lots of the security based on whether the trade order is an order to sell the security or an order to redeem the security.

6. The computer-readable medium of claim 5, wherein the instructions for selecting one or more lots comprise instructions for
   determining that the order is an order to redeem the security; and
   selecting one or more lots of the security having the lowest cost basis.

7. The computer-readable medium of claim 5, wherein the instructions for selecting one or more lots comprises instructions for:
   determining that the order is an order to sell the security; and
   selecting one or more lots of the security having the least tax liability.

8. The computer-readable medium of claim 5, wherein the software further comprises instructions for
   recording a selected lot of the security as a transaction.

* * * * *

UNITED STATES PATENT AND TRADEMARK OFFICE
CERTIFICATE OF CORRECTION

PATENT NO. : 8,073,757 B2  
APPLICATION NO. : 11/232571  
DATED : December 6, 2011  
INVENTOR(S) : Ronald Baldassini Page 1 of 1

It is certified that error appears in the above-identified patent and that said Letters Patent is hereby corrected as shown below:

In the Claims

Col. 8, line 24, claim 6, delete "for" and insert -- for: --

Col. 8, line 36, claim 8, delete "for" and insert -- for: --

Signed and Sealed this  
Eighth Day of October, 2013

Teresa Stanek Rea  
*Deputy Director of the United States Patent and Trademark Office*